United States Patent [19]
Sato et al.

[11] Patent Number: 5,969,886
[45] Date of Patent: Oct. 19, 1999

[54] LENS BARREL AND OPTICAL APPARATUS HAVING THE SAME

[75] Inventors: Shigeki Sato, Yokohama; Takashi Watanabe, Fuchu, both of Japan

[73] Assignee: Canon Kabushiki Kaisha, Tokyo, Japan

[21] Appl. No.: 08/957,113

[22] Filed: Oct. 24, 1997

[30] Foreign Application Priority Data

Oct. 31, 1996 [JP] Japan .................................. 8-304190

[51] Int. Cl.$^6$ ...................................................... G02B 7/02
[52] U.S. Cl. .......................... 359/813; 359/823; 359/554; 359/557; 396/53; 396/55
[58] Field of Search ................................. 359/813, 819, 359/823, 554, 557; 396/52, 53, 55, 158

[56] References Cited

U.S. PATENT DOCUMENTS

| | | | |
|---|---|---|---|
| 5,398,132 | 3/1995 | Otani | 359/557 |
| 5,581,317 | 12/1996 | Kitagawa et al. | 359/813 |
| 5,592,335 | 1/1997 | Omi et al. | 359/813 |
| 5,666,563 | 9/1997 | Iijima et al. | 396/53 |
| 5,673,149 | 9/1997 | Okada | 359/557 |
| 5,684,640 | 11/1997 | Tanaka et al. | 359/823 |
| 5,689,369 | 11/1997 | Noguchi | 359/557 |
| 5,774,266 | 6/1998 | Otani et al. | 359/554 |

FOREIGN PATENT DOCUMENTS 3188430  8/1991  Japan .

OTHER PUBLICATIONS

Patent Abstracts of Japan No. Hei 3–188430, published Aug. 16, 1991.

*Primary Examiner*—Loha Ben
*Attorney, Agent, or Firm*—Robin, Blecker & Daley

[57] ABSTRACT

A lens barrel comprises a vibration detecting device for detecting a vibration, a correcting optical device for correcting the vibration on the basis of an output of the vibration detecting device, and a diaphragm unit having a variable aperture diameter, and the vibration detecting device is disposed in a plane which is approximately flush with a driving part for the diaphragm unit and perpendicular to an optical axis, or the vibration detecting device is formed on or integrally with a lens barrel portion which holds an optical member other than the correcting optical device.

18 Claims, 8 Drawing Sheets

LENS BARREL AND OPTICAL APPARATUS HAVING THE SAME

BACKGROUND OF THE INVENTION

1. Field of the Invention

The present invention relates to a lens barrel which is arranged to restrain an image shake by detecting a vibration occurring in an optical apparatus such as a camera and moving correcting optical means in a direction perpendicular to the optical axis of the lens barrel by using the detected vibration as information for preventing an image shake, as well as to an optical apparatus having such lens barrel.

2. Description of Related Art

All the operations of current cameras that are important for photography, such as exposure decision and focusing, are automated, and even persons who are unfamiliar with camera operation rarely fail in photography. In addition, a system for correcting a vibration applied to a camera and preventing an image shake has recently been developed, and is proposed in, for example, Japanese Laid-Open Patent Application No. Hei 3-188430.

A camera system for preventing an image shake will be briefly described below.

Vibrations which are applied to cameras during photography normally have a frequency of 1 Hz to 12 Hz, and a basic concept for enabling a user to take a photograph free of an image shake with a camera even if such a vibration is applied thereto at the time of shutter release is to detect the vibration of the camera and displace the aforesaid correcting optical means according to the detected value.

Accordingly, in order to enable the user to take a photograph free of an image shake even if a vibration is applied to the camera, first, it is necessary to accurately detect the vibration of the camera, and secondly, it is necessary to correct a change based on the vibration in the photographing optical axis of the camera.

Theoretically, the detection of such vibration can be realized by incorporating vibration detecting means for detecting angular acceleration, angular speed, angular displacement and the like in a camera or a lens. An image shake can be restrained by driving and displacing correcting optical means for decentering the photographing optical axis on the basis of the detected information.

An image stabilizing system using such vibration Ad detecting means will be briefly described with reference to FIG. 8.

Figure 8:
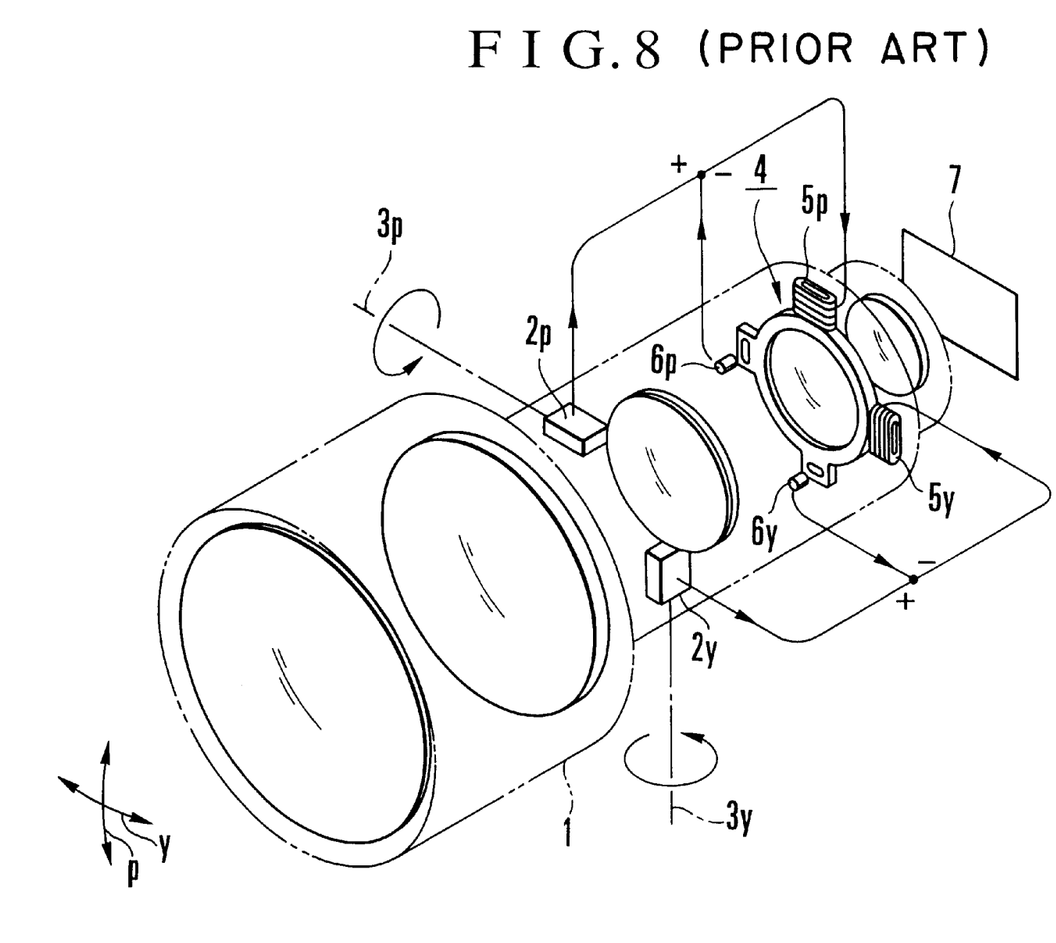
FIG. 8 is a schematic perspective view showing a correcting optical system used in a conventional lens barrel.

FIG. 8 schematically shows an example of a system for restraining an image shake derived from a vertical vibration p and a horizontal vibration y of a camera. The shown example includes a lens barrel 1, vibration detecting means 2p for detecting the vertical vibration p, and vibration detecting means 2y for detecting the horizontal vibration y. Reference numerals 3p and 3y denote the vibration detecting direction of the vibration detecting means 2p and the vibration detecting direction of the vibration detecting means 2y, respectively. The shown example also includes correcting optical means 4 which has coils 5p and 5y for giving thrust to the correcting optical means 4, and detecting elements 6p and 6y for detecting the position of the correcting optical means 4. The correcting optical means 4 is provided with a position control loop, and is driven by using the outputs of the vibration detecting means 2p and 2y as target values, to ensure stabilization of an image in an image plane 7.

As described above, as the number of functions of the apparatus itself is increased, more various elements such as vibration detecting means and driving means for driving the correcting optical means need to be incorporated into the apparatus. Accordingly, it is necessary to design the lens barrel so that a dead space therein can be efficiently used.

In the conventional lens barrel, since the vibration detecting means are provided in the vicinity of the mount of the lens barrel, the vibration detecting means need to be incorporated in a shield component which completely cover them, in order to reduce the disturbance of the vibration detecting means, such as the noise of a mirror-up operation of a camera.

However, if the vibration detecting means are disposed in the vicinity of the mount, as in the conventional example, an increase in the entire optical length of an optical system is involved.

In addition, the vibration detecting means need to have a shield component for preventing the disturbance, and needs a larger number of components and has the problem of inferior easiness of assembly.

BRIEF SUMMARY OF THE INVENTION

It is, therefore, an object of the present invention to provide a lens barrel which can be made compact in size or can be reduced in the required number of components and improved in easiness of assembly even if vibration detecting means and correcting optical means are disposed in the lens barrel.

In accordance with the present invention, in a lens barrel including vibration detecting means for detecting a vibration, and correcting optical means for correcting the vibration, the vibration detecting means is disposed in a lens barrel portion (a holding portion) for holding a member other than the correcting optical means, such as a mounting surface of a driving part for a diaphragm unit.

In accordance with one aspect of the present invention, there is provided a lens barrel which comprises vibration detecting means for detecting a vibration, correcting optical means for correcting the vibration on the basis of an output of the vibration detecting means, and a diaphragm unit having a variable aperture diameter, the vibration detecting means being disposed in a plane approximately flush with a driving part for the diaphragm unit and perpendicular to an optical axis. According to this construction, the lens barrel itself can be made compact.

In accordance with another aspect of the present invention, there is provided a lens barrel which comprises vibration detecting means for detecting a vibration, correcting optical means for correcting the vibration on the basis of an output of the vibration detecting means, a diaphragm unit having a variable aperture diameter, and holding means for holding the vibration detecting means, the holding means being arranged to serve as a shield part for preventing disturbance of the vibration detecting means, the holding means and the diaphragm unit being formed integrally with each other. According to this construction, the lens barrel itself can be made compact and can also be formed as one unit consisting of a reduced number of components.

In accordance with still another aspect of the represent invention, there is provided a lens barrel which comprises vibration detecting means for detecting a vibration, correcting optical means for correcting the vibration on the basis of an output of the vibration detecting means, holding means for holding the vibration detecting means, the holding means being arranged to serve as a shield part for preventing disturbance of the vibration detecting means, and a lens barrel portion for holding an optical member other than the correcting optical means, the holding means and the lens barrel portion being formed integrally with each other. According to this construction, the lens barrel can be made compact without increasing the required number of components.

In each of the aspects of the present invention, the driving part for the diaphragm unit and the vibration detecting means are connected to a packaged circuit board which performs operations such as control of a body of the lens barrel, by one common flexible printed circuit board. Accordingly, it is possible to reduce the complexity of assembly and the required number of components, and since connectors or the like can be reduced in number, it is possible to reduce the packaging area of a packaged circuit board.

In each of the aspects of the present invention, the vibration detecting means includes two vibration detecting means per lens barrel which are disposed perpendicularly to each other, so that a one-to-one relationship is obtained between the correcting optical means and the driving part and the matching of them is improved.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below in detail with reference to the accompanying drawings.

Figure 1:
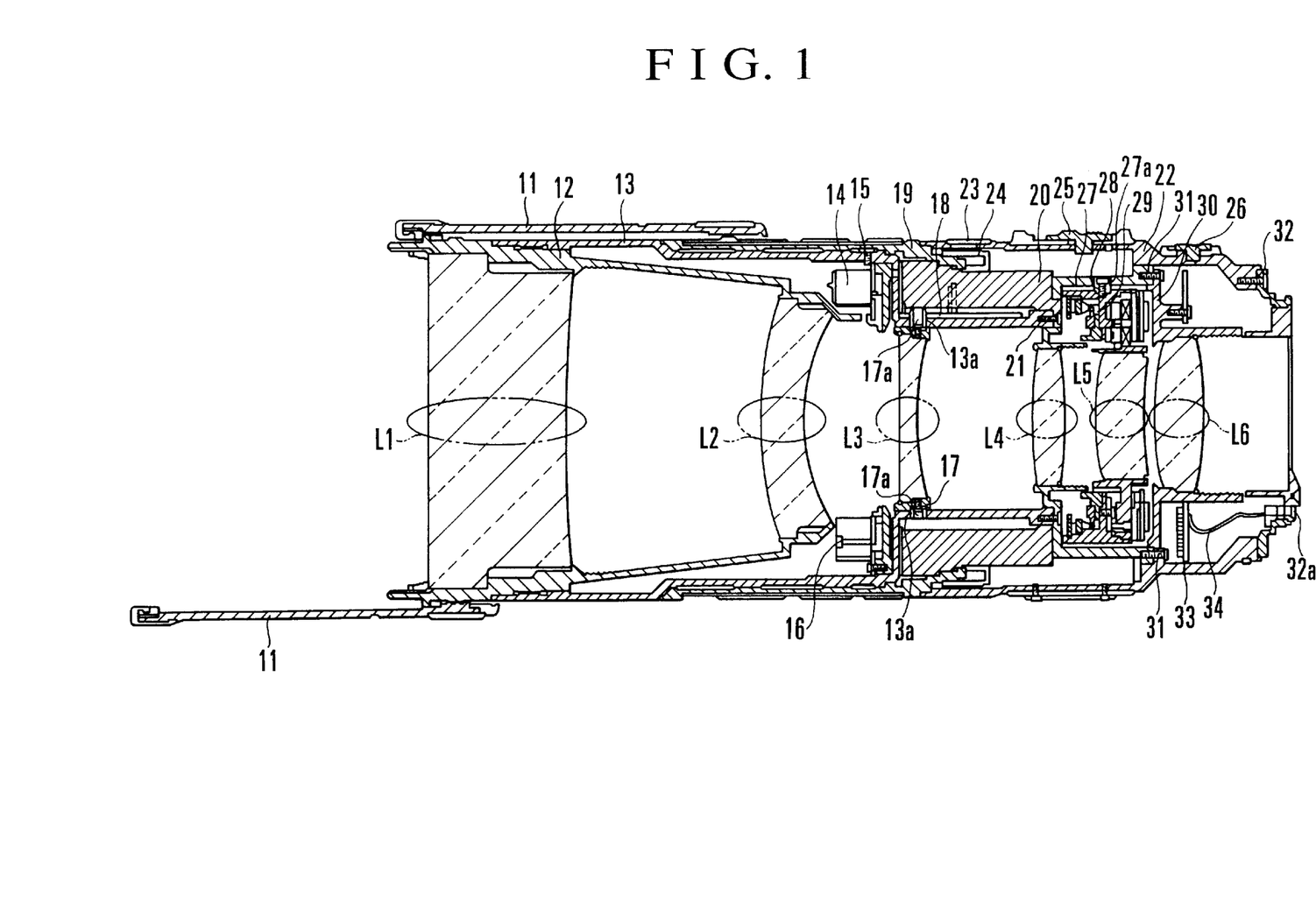
FIG. 1 is a diagrammatic cross-sectional view showing a lens barrel according to a first embodiment of the present invention.
Figure 2A:
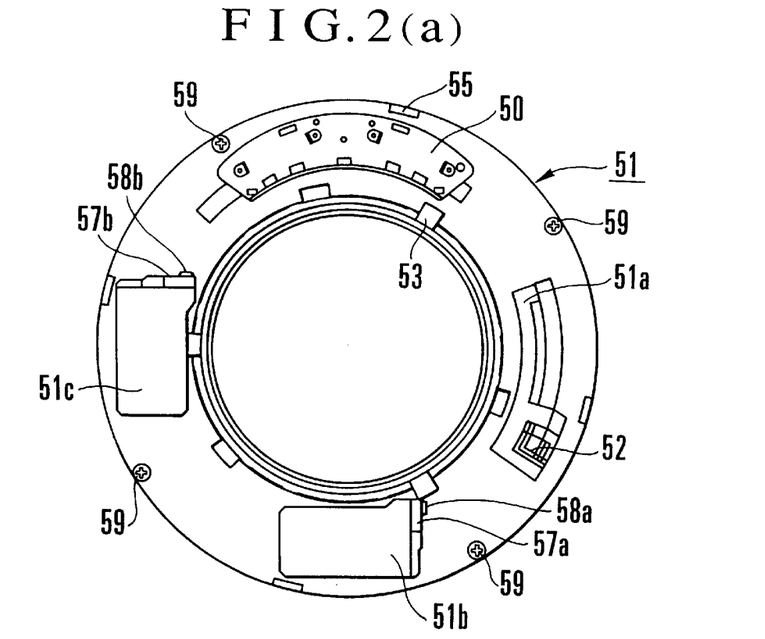
FIGS. 2(a) and 2(b) are diagrammatic front views respectively showing a diaphragm unit and a flexible printed circuit board provided in the lens barrel shown in FIG. 1.
Figure 2B:
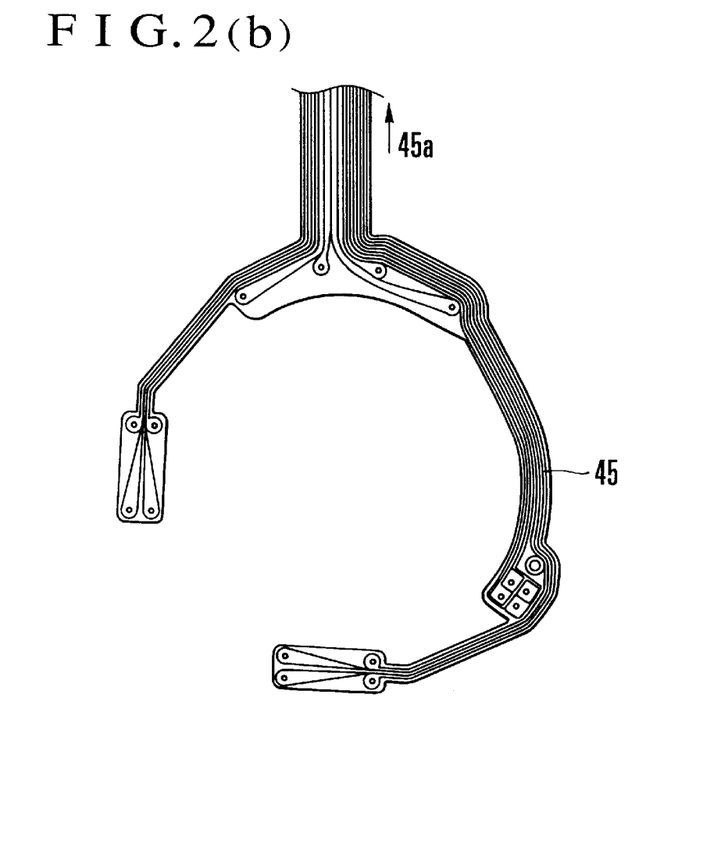
Figure 3:
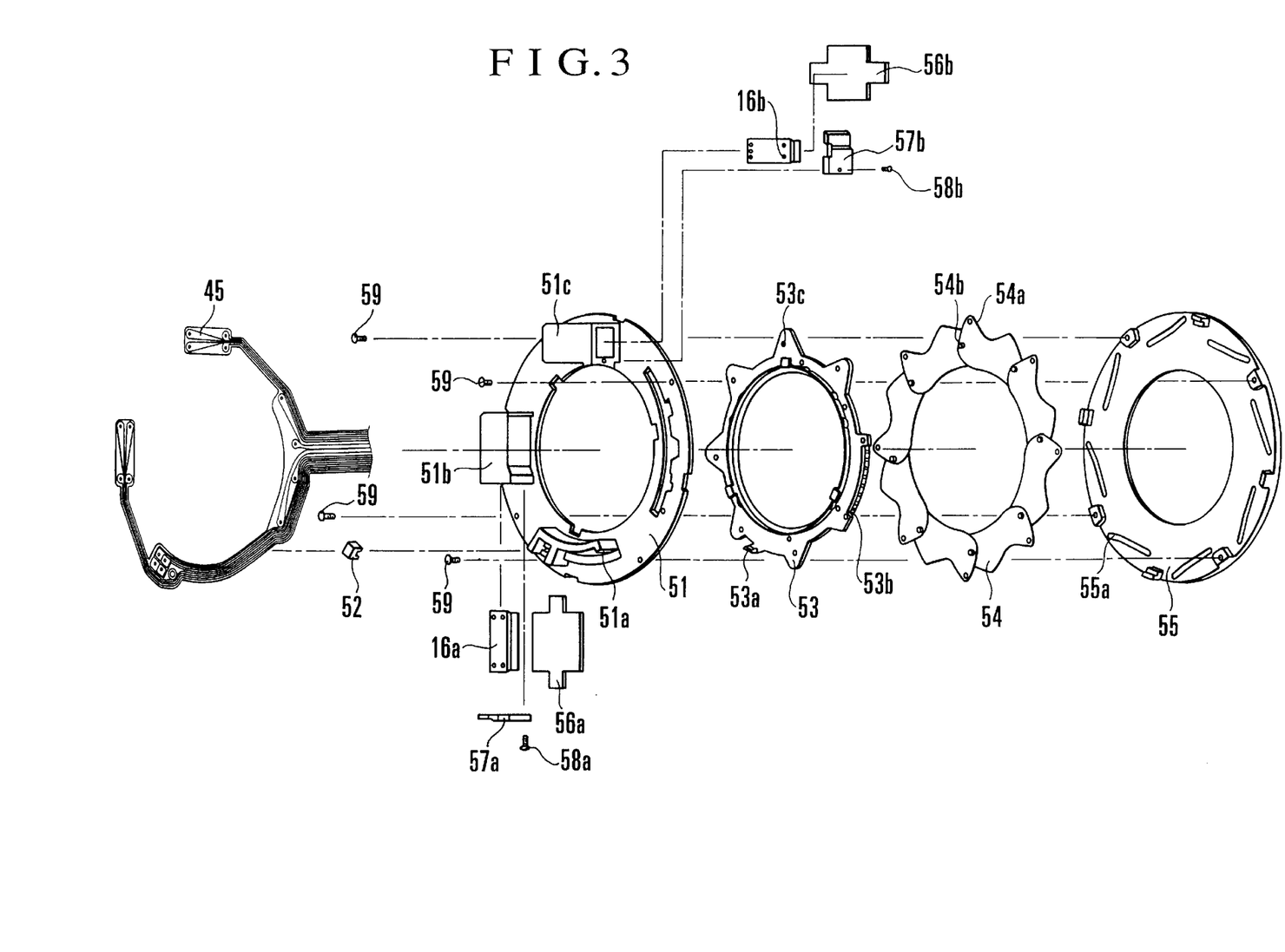
FIG. 3 is a diagrammatic exploded perspective view showing the diaphragm unit.
Figure 4:
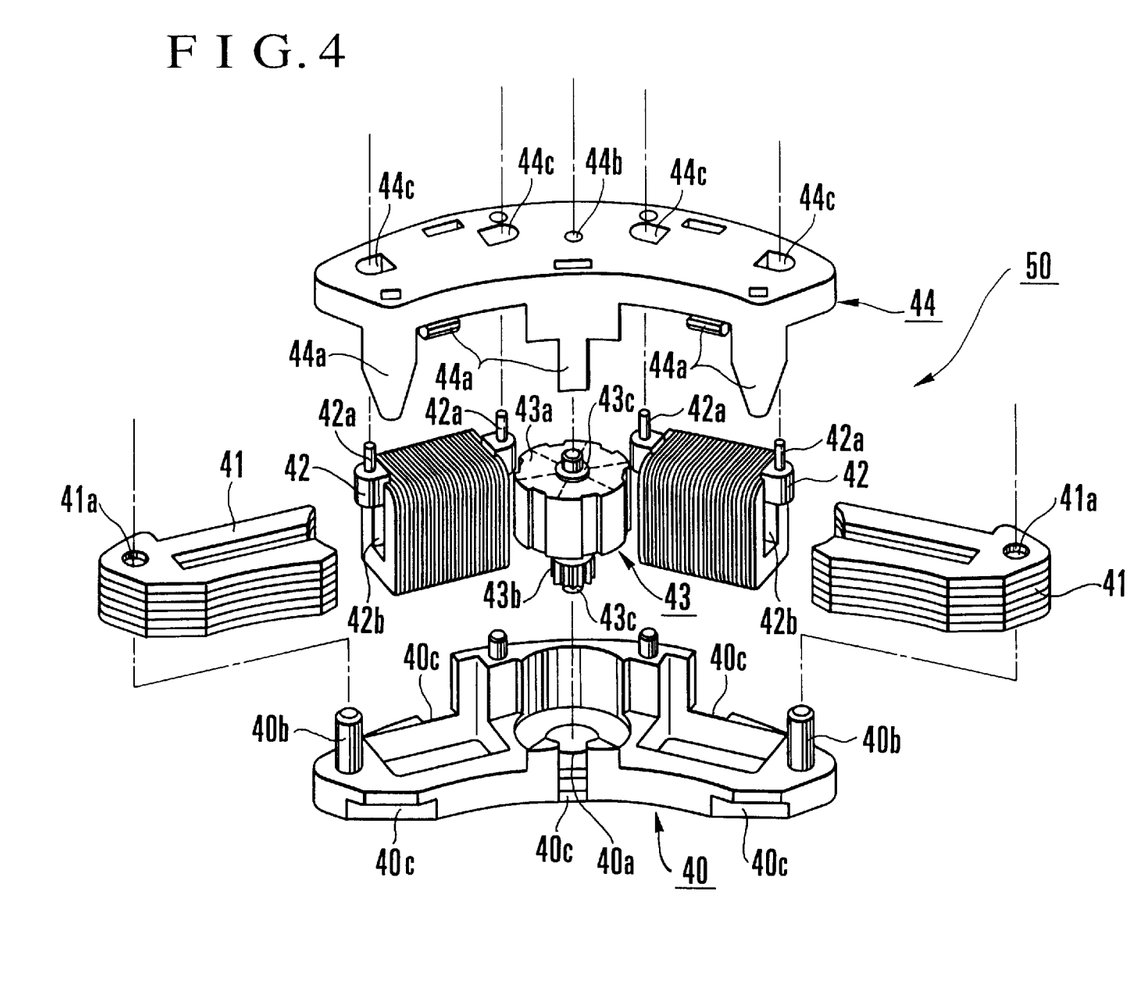
FIG. 4 is a diagrammatic exploded perspective view showing a driving part for the diaphragm unit.
Figure 5:
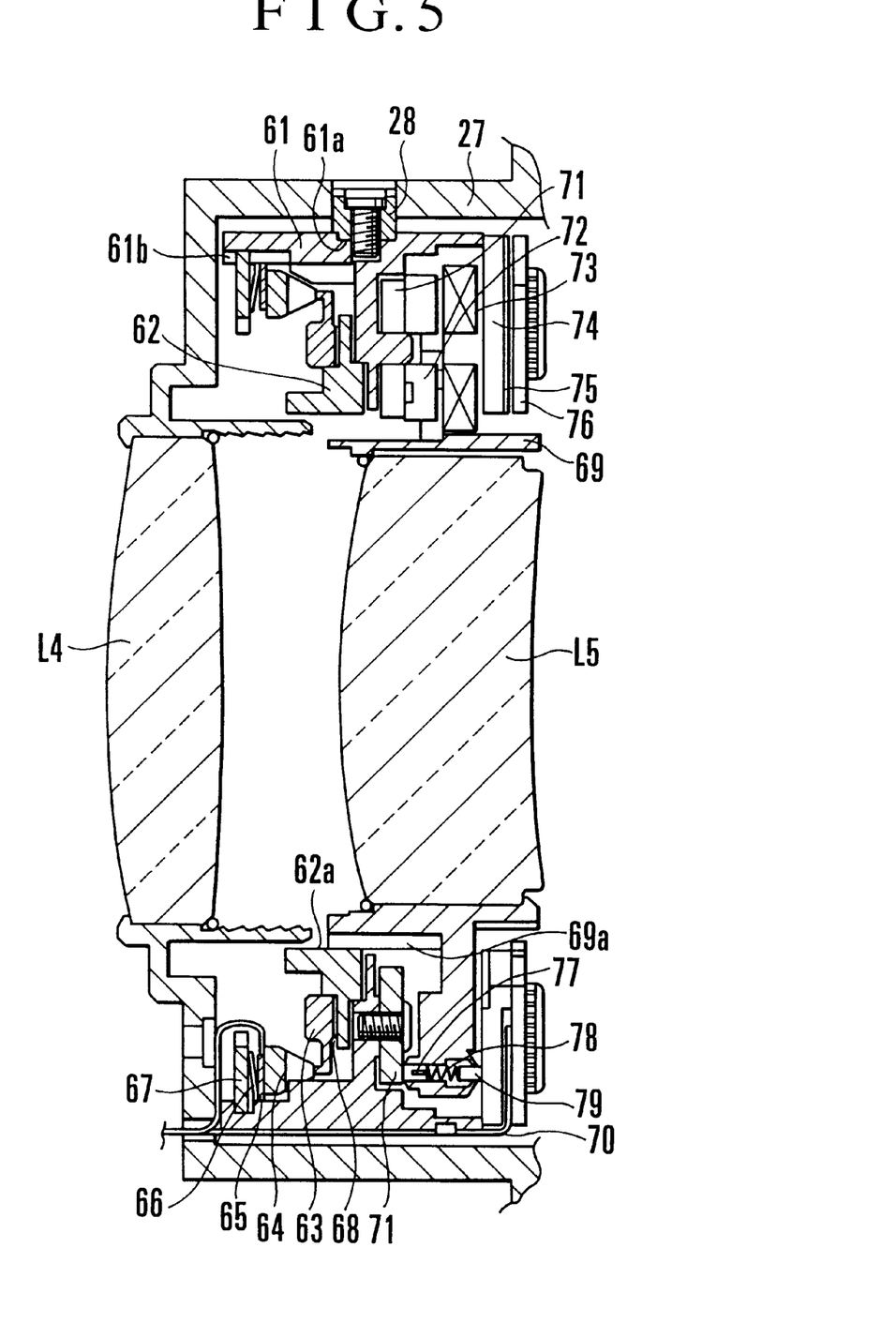
FIG. 5 is a diagrammatic cross-sectional view showing the vicinity of the correcting optical device in the lens barrel shown/in FIG. 1.

FIG. 1 is a diagrammatic cross-sectional view showing the lens barrel of a telephoto lens provided with a correcting optical device, for use with a single-lens reflex camera according to a first embodiment of the present invention, FIGS. 2(a) and 2(b) are diagrammatic front views respectively showing a diaphragm unit and a flexible printed circuit board provided in such lens barrel, FIG. 3 is a diagrammatic exploded perspective view showing the diaphragm unit, FIG. 4 is a diagrammatic exploded perspective view showing a driving part for the diaphragm unit, and FIG. 5 is a diagrammatic cross-sectional view showing the vicinity of the correcting optical device in the lens barrel shown in FIG. 1.

Referring to FIG. 1, a built-in hood 11 is fitted onto the peripheral portion of a front-lens-group tube 12 which will be described later, and is arranged in such a manner that if harmful light may enter the lens barrel, the built-in hood 11 can be moved forward to cut the harmful light, as depicted in a bottom portion of FIG. 1. The front-lens-group tube 12 supports a lens group Li and a lens group L2, and is fixed to a guide tube 13. The guide tube 13 has three focusing cams 13a in a rear small-diameter portion, and a diaphragm unit 14 is fixed to the guide tube 13 by a screw 15. In addition, two vibration detecting means 16 which will be described later are respectively incorporated in shield portions in a plane approximately flush with a driving part for the diaphragm unit 14 and perpendicular to the optical axis of the telephoto lens in such a manner that the two vibration detecting means 16 are perpendicular to each other so that they can detect vertical vibration and horizontal vibration, respectively, as will be described later. The details of the vibration detecting means 16 will be described later. Further, a movable tube 17 which supports a lens group L3 in its inner-diameter portion is fitted into the rear small-diameter portion of the guide tube 13, and a focusing key 18 is rotatably provided on the periphery of the outer-diameter portion of the guide tube 13. One of focusing rollers 17a of the movable tube 17 is engaged with one of the focusing cams 13a and the focusing key 18.

A manual ring 19 is rotatably fitted on an intermediate large-diameter portion of the guide tube 13. The manual ring 19 is arranged in such a manner that the focusing key 18 is rotated by a rotation of the manual ring 19 via an operating device provided in an actuator unit 20 fixed to the periphery of the rear small-diameter portion of the guide tube 13 by a screw 21, thereby causing the movable tube 17 to travel along the optical axis so as to effect focus adjustment.

A fixed tube 22 is disposed on the rear-end side of the guide tube 13, and a scale window 23 made in part from a transparent material is provided in the front portion of the fixed tube 22 in such a manner that a distance scale 24 which rotates about the optical axis with the rotation of the focusing key 18 can be visually confirmed by a user. A vibration correcting switch 25 and an AF/MF selecting switch 26 are provided on the periphery of the fixed tube 22 in such a manner that the vibration correcting switch 25 precedes the AF/MF selecting switch 26 in the direction of the optical axis, and a connection tube 27 and a sixth-lens-group tube 30 are provided in the inner-diameter portion of the fixed tube 22. If the user desires to cause a correcting lens group L5 (to be described later) to perform a vibration correcting operation, the user turns on the vibration correcting switch 25, whereas if the telephoto lens is to be put into normal use, the user turns off the vibration correcting switch 25. If the AF/MF selecting switch 26 is set to an AF (automatic focusing) position, the actuator 20 is driven to rotate the focusing key 18, on the basis of a focusing signal supplied from a camera side, whereas if the AF/MF selecting switch 26 is set to an MF (manual focusing) position, the user is allowed to rotate the manual ring 19 and effect a similar operation in the above-described manner.

The connection tube 27 connects and supports the fixed tube 22 and the guide tube 13, and a lens group L4 is held at the front end of the connection tube 27, while a correcting optical device 29 is supported at its rear end via a roller 28 inserted in a hole 27a. The sixth-lens-group tube 30 which holds a lens group L6 is connected to the rear end surface of the connection tube 27 by screws 31.

The correcting optical device 29 has the correcting lens group L5 and is capable of serving a vibration correcting effect by driving the correcting lens group L5 in directions perpendicular to the optical axis. The details of the correcting optical device 29 will be described later with reference to FIG. 5.

A mount 32 is secured to the rear end surface of the fixed tube 22 and has a bayonet structure for connection to a single-lens reflex camera or the like. A contact block 32a is fixed to the rear end surface of the mount 32 so that electrical signals can be transmitted to or received from a camera-side microcomputer.

A packaged circuit board 33 has elements such as an IC, and is disposed between the fixed tube 22 and the sixth-lens-group tube 30 and is connected to the driving part provided in the diaphragm unit 14, the vibration detecting means 16, the actuator unit 20 and the correcting optical device 29 via a flexible printed circuit board (not shown) and also to the contact block 32a via a lead wire 34.

Then, the diaphragm unit 14 and a driving part 50 thereof will be described with reference to FIGS. 2(a) to 4.

First, the driving part 50 shown in FIG. 4 will be described. A bearing plate 40 has a hole 40a in its central portion, and shaft portions 40b are respectively projected from the opposite end portions of the upper side of the bearing plate 40. A total of five recesses 40c, three of which are inward recesses and two of which are outward recesses, are formed in the opposite side portions of the bearing plate 40. Two yokes 41 are respectively inserted in and held by hollow portions 42b of bobbins 42 each having a pair of terminal pins 42a, and the yokes 41 are fixed to the shaft portions 40b with holes 41a of the respective yokes 41 fitted on the shaft portions 40b. A rotor magnet 43 has a magnet portion 43a magnetized to have six poles and a gear portion 43b at one end of a shaft portion 43c, and the shaft portion 43c of the rotor magnet 43 is fitted in the central hole 40a. Then, the gear portion 43b of the rotor magnet 43 is meshed with a gear portion 53b provided on a rotating member 53 which will be described later.

A cover 44 has in the lower portions of its opposite side portions a total of five claw portions 44a three of which are inward claw portions and two of which are outward claw portions, and a hole 44b is formed in the center portion of the cover 44 and a pair of holes 44c are formed on each of the opposite sides of the hole 44b. The upper end portion of the shaft portion 43c of the rotor magnet 43 is fitted in the hole 44b of the cover 44, and the respective terminal pins 42a of the bobbins 42 are inserted through the holes 44c and electrically connected to a flexible printed circuit board 45 by soldering. The respective claw portions 44a are fitted in the corresponding recesses 40c of the bearing plate 40 to support the entire stepping driving motor part. The driving part 50 is constructed in the above-described manner.

Then, the construction of the diaphragm unit 14 will be described with reference to FIGS. 2(a), 2(b) and 3.

The driving part 50 is assembled by securing the bearing plate 40 to a pressure plate 51, assembling together the rotor magnet 43, the bobbins 42 and the yokes 41 and the like, and securing them to the bearing plate 40 by means of the cover 44.

An interrupter 52 for detecting the fully open aperture of the diaphragm unit 14 is secured to a projecting portion 51a of the pressure plate 51 so that the fully open aperture is detected when a projection 53a of the rotating member 53 in the diaphragm unit 14 engages with a slit of the interrupter 52.

The pressure plate 51 has two shield portions (hole portions) 51b and 51c provided at two horizontal and vertical positions, and the vibration detecting means 16 (composed of a pair of vibration detecting means 16a and 16b) are fitted in the respective shield portions 51b and 51c. The vibration detecting means 16a and 16b as well as the terminals of the driving part 50 (the terminal pins 42a shown in FIG. 4) and the interrupter 52 are interconnected by the flexible printed circuit board 45. One end 45a of the flexible printed circuit board 45 is connected to a connector of the packaged circuit board 33.

The vibration detecting means 16a and 16b are respectively covered with foamed sheets 56a and 56b which also serve as shock absorbers, so that the respective vibration detecting means 16a and 16b can be firmly secured in the shield portions 51b and 51c of the pressure plate 51. After the vibration detecting means 16a and 16b have been inserted in the respective shield portions 51b and 51c, shield lids 57a and 57b are respectively closed with screws 58a and 58b so as to protect the vibration detecting means 16a and 16b against disturbance.

A base plate 55 has a plurality of cams 55a in which dowels 54a of diaphragm blades 54 are respectively inserted, and is secured to the reverse side of the pressure plate 51 by screws 59 with the rotating member 53 sandwiched therebetween. The rotating member 53 is rotated about the optical axis with the gear portion 53b being meshed with the gear portion 43b of the rotor magnet 43 of the driving part 50 in the above-described manner, so that since dowels 54b of the respective diaphragm blades 54 are inserted in holes 53c of the rotating member 53, the diaphragm blades 54 are selectively opened and closed.

The construction of the correcting optical device 29 will be described below with reference to FIG. 5.

Referring to FIG. 5, a base plate 61 is supported by the connection tube 27 with the roller 28 being fitted in a hole 61a provided in the periphery of the base plate 61. A lock ring 62 is rotatably supported by engagement with a front step of an intermediate partition of the base plate 61, and a rotor 63 is secured to the front side of the lock ring 62 via a rubber ring 68. A stator 64 is opposed to the front side of the rotor 63, and an electrostrictive element is bonded to the side of the stator 64 which faces a flexible printed circuit board. The stator 64 is urged toward the lock ring 62 by a pressure plate 67 via a felt 65 and a spring washer 66 which are located in the front of the stator 64. The pressure plate 67 is fixed by so-called bayonet connection, i.e., by rotating the pressure plate 67 after passing it through three cutouts 61b formed in the front edge of the base plate 61.

A support frame 69 which holds the correcting lens group L5 with a C ring or the like has radial projections 69a provided on the periphery of the support frame 69 at three locations thereof, and when the correcting lens group L5 is in a normally engaged state, front end portions of the respective projections 69a are fitted into an inner circumferential surface 62a of the lock ring 62. If the correcting lens group L5 is to be placed into a disengaged state or an engaged state, a voltage is applied to the electrostrictive element through a flexible printed circuit board 70 by a control circuit (not shown) so that the front end portion of the stator 64 is vibrated to rotate the rotor 63, and the lock ring 62 is rotated via the rubber ring 68 with the rotation of the rotor 63.

When in either of the engaged and disengaged states, the correcting lens group L5 is held by the urging force produced by the pressure plate 67 and the spring washer 66, i.e., the self-holding force of an ultrasonic motor. Accordingly, no electricity is consumed whether the correcting lens group L5 is held in the engaged or disengaged state.

On the rear surface of the intermediate partition of the base plate 61, a permanent magnet (shift magnet) 72 made from a neodymium magnet or the like is magnetically attracted to a second yoke 71 made of a magnetic material and coated with glossy plating. A coil (shift coil) 73 is bonded to the periphery of the support frame 69 rearward of the intermediate partition of the base plate 61 in such a manner as to be opposed to the permanent magnet 72. A first yoke 74 is secured at a location corresponding to a rear portion of the support frame 69, and a surface of the first yoke 74 is covered with an insulating sheet 75 and a hard printed circuit board 76 provided with a plurality of ICs, a position-detecting PSD and the like is joined to the insulating sheet 75 by a screw (not shown). The flexible printed circuit board 70 for signal transmission is connected to the hard printed circuit board 76 by thermocompression bonding. The flexible printed circuit board 70 is provided with a pair of arms in a plane perpendicular to the optical axis, and the shift coil 73 and an IRED (not shown) are connected to the respective arms. These IRED and PSD are used to detect the position of the correcting lens group L5.

Support balls 77 and 79, which are urged in the opposite directions to each other in parallel with the optical axis by a spring 78 interposed therebetween, are provided on part of the periphery of the support frame 69, so that the support frame 69 is forced against the first yoke 74 at a location between the first yoke 74 and the second yoke 71 so as not to travel in the direction of the optical axis.

Referring to the driving of the correcting optical device 29 having the above-described construction, electrical signals from the vibration detecting means 16 are transmitted to the packaged circuit board 33, and the information obtained at the packaged circuit board 33 is transmitted to the correcting optical device 29 through the flexible printed circuit board 70. Then, the correcting optical device 29 drives the correcting lens group L5 in a direction perpendicular to the optical axis by an operation similar to that of the conventional example, so as to prevent occurrence of an image shake.

Figure 6:
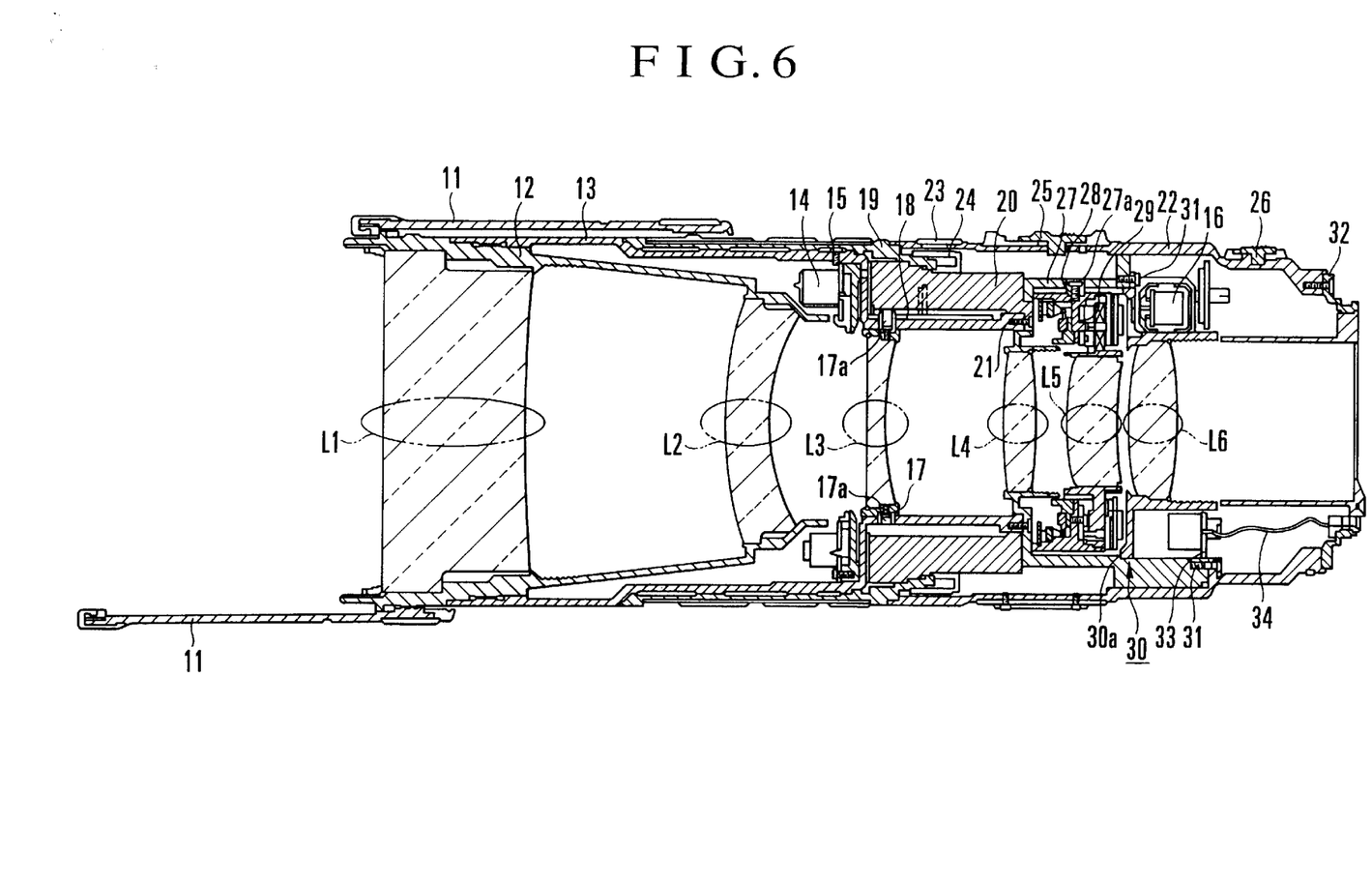
FIG. 6 is a diagrammatic cross-sectional view showing a lens barrel according to a second embodiment of the present invention.
Figure 7:
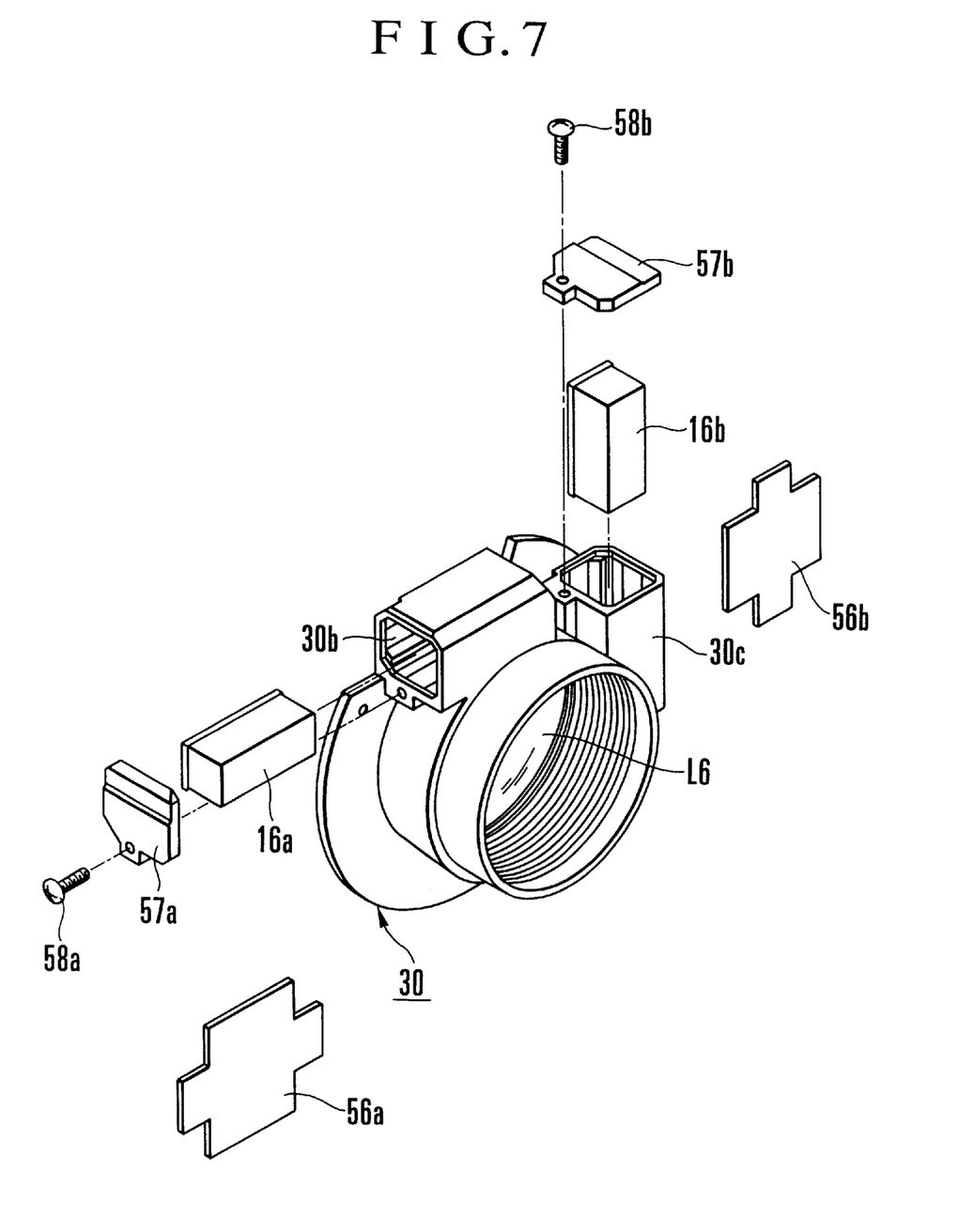
FIG. 7 is a diagrammatic exploded perspective view showing the vicinity of a sixth-lens-group tube of the lens barrel shown in FIG. 6.

FIGS. 6 and 7 show a second embodiment of the present invention.

FIG. 6 is a diagrammatic cross-sectional view of the essential portion of the lens barrel of a telephoto lens provided with a correcting optical device according to the second embodiment of the present invention, and FIG. 7 is a diagrammatic exploded perspective view showing a sixth-lens-group tube of the lens barrel. In FIGS. 6 and 7, identical reference numerals are used to denote portions identical to those of the first embodiment and the description thereof is omitted for the sake of simplicity, and only different points will be referred to below.

In the second embodiment, the vibration detecting means 16 are provided on a sixth-lens-group tube 30 instead of on the diaphragm unit 14 in the first embodiment.

Specifically, the sixth-lens-group tube 30 which holds the lens group L6 is connected to the rear end surface of the connection tube 27 by the screws 31, and the rotational phase of the sixth-lens-group tube 30 is determined by a projection 30a formed at the front end surface of the sixth-lens-group tube 30. Two shield portions (hole portions) 30b and 30c in which to fit the vibration detecting means 16 are provided at two horizontal and vertical positions on the periphery of the sixth-lense-group tube 30. The vibration detecting means 16a and 16b are respectively covered with the foamed sheets 56a and 56b which also serve as shock absorbers, so that the respective vibration detecting means 16a and 16b can be firmly secured in the shield portions 30b and 30c. After the vibration detecting means 16a and 16b have been inserted in the respective shield portions 30b and 30c, the shield lids 57a and 57b are respectively closed with the screws 58a and 58b so as to protect the vibration detecting means 16a and 16b against disturbance. The vibration detecting means 16a and 16b are connected to a flexible printed circuit board (not shown) and also to the connector of the packaged circuit board 33. The other construction and the control operation of the second embodiment are similar to those of the first embodiment.

Although each of the embodiments has been described with reference to an interchangeable lens for a single-lens reflex camera by way of example, the present invention is, of course, applicable to other optical apparatus, and various modifications can be made without departing from the scope of the invention. For example, the present invention may be applied to a shutter unit or a focusing unit instead of a diaphragm unit, or a lens barrel the lenses of which are driven on a camera side, and detecting means capable of detecting biaxial vibrations may also be used for vibration detection.

We claim:

1. A lens barrel comprising:

a plurality of optical elements; vibration detecting means for detecting a vibration of said lens barrel;

correcting means for correcting a vibration of an image due to the vibration, on the basis of an output of said vibration detecting means; and a diaphragm unit having a variable aperture diameter, said vibration detecting means being disposed in a plane approximately flush with a driving portion of said diaphragm unit and perpendicular to an optical axis of said lens barrel.

2. A lens barrel according to claim 1, wherein a driving part of said diaphragm unit and said vibration detecting means are connected to a packaged circuit board which performs control of a body of said lens barrel, by one common flexible printed circuit board.

3. An optical apparatus comprising said lens barrel according to claim 2.

4. A lens barrel according to claim 1, wherein said vibration detecting means includes two vibration detecting means per lens barrel which are disposed perpendicularly to each other.

5. An optical apparatus comprising said lens barrel according to claim 4.

6. A lens barrel comprising:

a plurality of optical elements; vibration detecting means for detecting a vibration of said lens barrel;

correcting means for correcting a vibration of an image due to the vibration, on the basis of an output of said vibration detecting means;

a diaphragm unit having a variable aperture diameter; and holding means for holding said vibration detecting means, said holding means having a shield part for preventing disturbance of said vibration detecting means, said holding means and said diaphragm unit being provided integrally with each other.

7. An optical apparatus comprising said lens barrel according to claim 6.

8. A lens barrel according to claim 6, wherein a driving part of said diaphragm unit and said vibration detecting means are connected to a packaged circuit board which performs control of a body of said lens barrel, by one common flexible printed circuit board.

9. An optical apparatus comprising said lens barrel according to claim 8.

10. A lens barrel according to claim 6, wherein said vibration detecting means includes two vibration detecting means per lens barrel which are disposed perpendicularly to each other.

11. An optical apparatus comprising said lens barrel according to claim 10.

12. A lens barrel comprising:

vibration detecting means for detecting a vibration of said lens barrel;

correcting means for correcting a vibration of an image due to the vibration, on the basis of an output of said vibration detecting means;

first holding means for holding said vibration detecting means, said holding means having a shield part for preventing disturbance of said vibration detecting means; and second holding means for holding a lens element, said first and second holding means being formed integrally with each other.

13. An optical apparatus comprising said lens barrel according to claim 12.

14. A lens barrel comprising:

vibration detecting means for detecting a vibration of said lens barrel;

correcting means for correcting a vibration of an image due to the vibration, on the basis of an output of said vibration detecting means; and a lens holder for holding a lens element, said vibration detecting means being provided on said lens holder.

15. An optical apparatus comprising said lens barrel according to claim 14.

16. An optical apparatus comprising said lens barrel according to claim 1.

17. A lens barrel comprising:

vibration detecting means for detecting a vibration of said lens barrel;

correcting means for correcting a vibration of an image due to the vibration, on the basis of an output of said vibration detecting means, said correcting means having a movable optical element; and holding means for holding an optical element other than said movable optical element, said vibration detecting means being disposed on said holding means.

18. An optical apparatus comprising said lens barrel according to claim 17.

* * * * *

UNITED STATES PATENT AND TRADEMARK OFFICE
CERTIFICATE OF CORRECTION

PATENT NO. : 5,969,886
DATED : October 19, 1999
INVENTOR(S) : Shigeki Sato, et al.

It is certified that error appears in the above-identified patent and that said Letters Patent are hereby corrected as shown below:

Col. 1, line 46, after "vibration" delete -- Ad --.
Col. 4, line 12, delete "Li" and insert -- L1 --.
Col. 8, line 3, delete "sixth-lense-group" and insert -- sixth-lens-group --.

Signed and Sealed this

Seventeenth Day of April, 2001

Attest:

NICHOLAS P. GODICI

Attesting Officer
Acting Director of the United States Patent and Trademark Office